(12) United States Patent
Kuroda et al.

(10) Patent No.: US 6,363,311 B1
(45) Date of Patent: Mar. 26, 2002

(54) RUNNING CONTROLLER FOR AUTOMOBILE

(75) Inventors: Hiroshi Kuroda, Hitachi; Hiroshi Takenaga, Tokai-mura; Satoru Kuragaki; Mitsuo Kayano, both of Hitachi; Toshimichi Minowa; Kazuaki Takano, both of Mito, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/555,480

(22) PCT Filed: Dec. 1, 1997

(86) PCT No.: PCT/JP97/04375

§ 371 Date: Jun. 1, 2000

§ 102(e) Date: Jun. 1, 2000

(87) PCT Pub. No.: WO99/28144

PCT Pub. Date: Jun. 10, 1999

(51) Int. Cl.⁷ .............................. B60T 8/32; G01S 13/04
(52) U.S. Cl. .............................. 701/96; 701/93; 701/23; 342/70; 340/435; 340/436; 180/168
(58) Field of Search .............................. 701/93, 96, 23, 701/25; 180/167, 168, 169; 342/70, 71; 340/435, 436

(56) References Cited

U.S. PATENT DOCUMENTS 5,828,968 A * 10/1998 Iiboshi et al. ................. 701/23
5,959,569 A * 9/1999 Khodabhai ................... 342/70

FOREIGN PATENT DOCUMENTS

| JP | 58-43009 | 3/1983 |
| JP | 61-30428 | 10/1987 |
| JP | 1-114550 | 5/1989 |
| JP | 3-6473 | 1/1991 |
| JP | 3-118699 | 5/1991 |
| JP | 6-59033 | 4/1994 |
| JP | 6-150200 | 5/1994 |
| JP | 6-20649 | 7/1994 |
| JP | 6-320986 | 11/1994 |
| JP | 8-192661 | 7/1996 |
| JP | 8-240658 | 9/1996 |

* cited by examiner

Primary Examiner—Yonel Beaulieu
(74) Attorney, Agent, or Firm—Crowell & Moring LLP

(57) ABSTRACT

A vehicle speed control apparatus for allowing a host vehicle trailing a preceding vehicle to accelerate and decelerate without causing discomfort to the host vehicle driver. While the host vehicle is trailing the preceding vehicle, the apparatus on board the host vehicle stores the speed of the preceding vehicle entering a curve ahead as well as a headway distance of the host vehicle to the preceding vehicle. Upon reaching the curve, the host vehicle is controlled by the apparatus to enter the curve at a speed not in excess of the stored speed of the preceding vehicle.

8 Claims, 15 Drawing Sheets

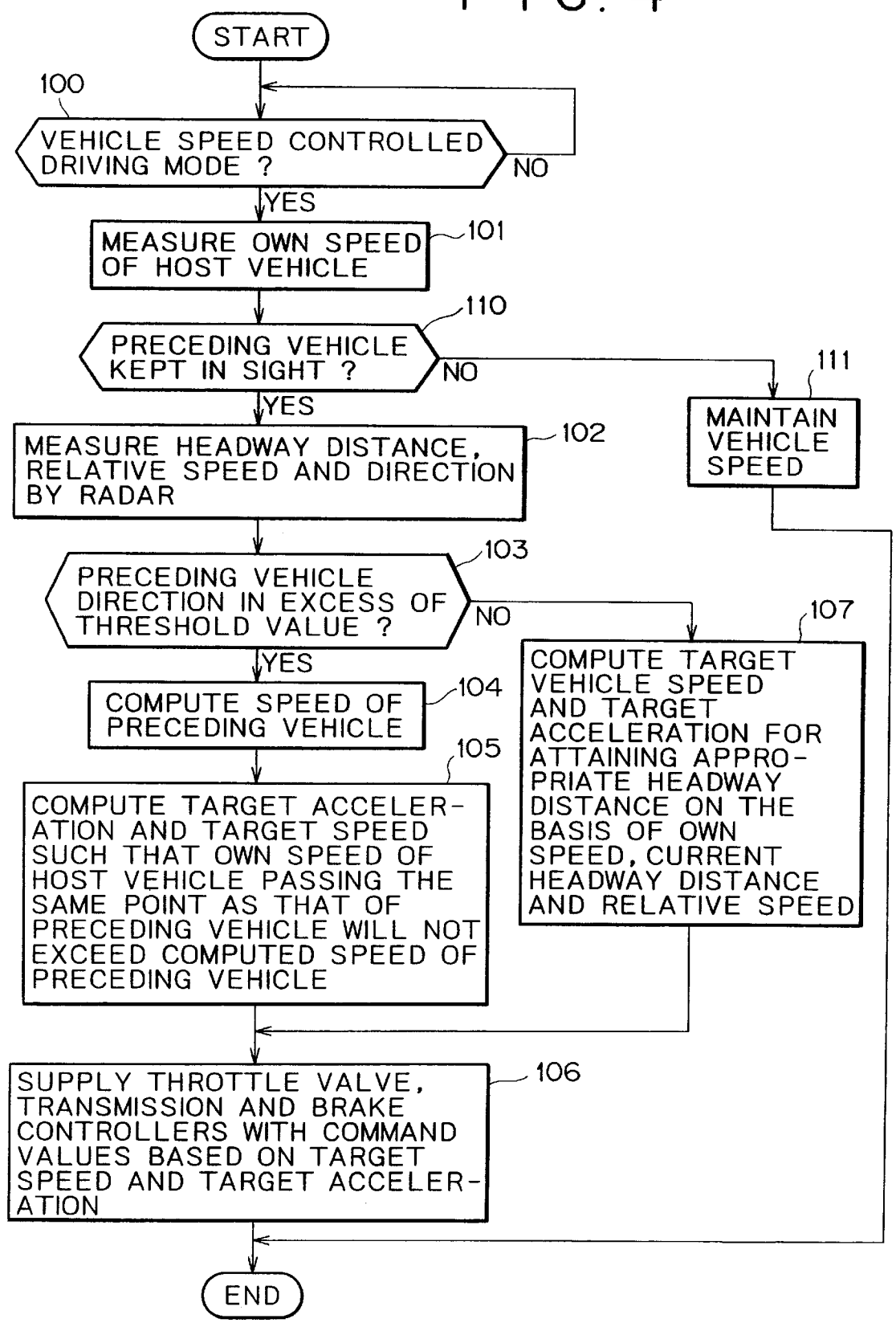

FIG. 13

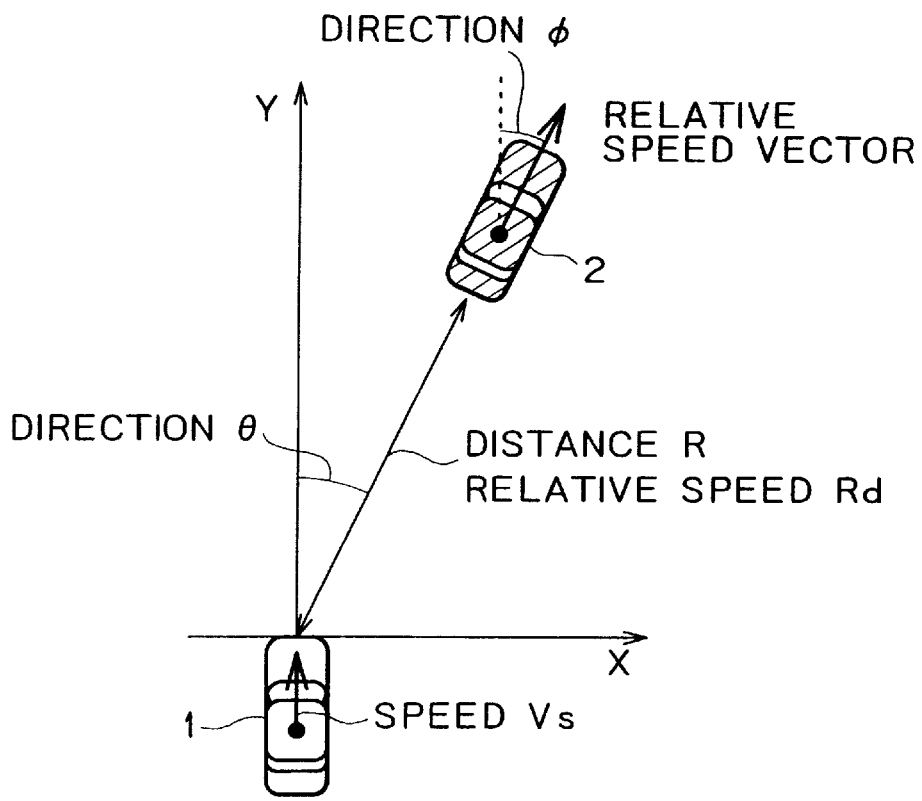

| RELATIVE POSITION COORDINATES | $\begin{cases} x = R \cdot \cos\theta \\ y = R \cdot \sin\theta \end{cases}$ |

RELATIVE SPEED VECTOR $$V(\dot{x}, \dot{y}) = (Rd \cdot \sin\theta + R \cdot \dot{\theta} \cdot \cos\theta,\ Rd \cdot \cos\theta - R \cdot \dot{\theta} \cdot \sin\theta)$$

RELATIVE SPEED VECTOR (IN POLAR COORDINATES)

$$\begin{cases} |V| = \sqrt{\dot{x}^2 + \dot{y}^2} \\ \phi = \tan^{-1}\dfrac{\dot{x}}{\dot{y}} \end{cases}$$

RELATIVE YAW RATE $$\omega = \frac{d}{dt}\phi = \frac{\dot{x} \cdot \ddot{y} - \dot{y} \cdot \ddot{x}}{|V|^2}$$

RUNNING CONTROLLER FOR AUTOMOBILE

TECHNICAL FIELD

The present invention relates to a vehicle speed control apparatus for controlling the speed of an own vehicle relative to a preceding vehicle.

BACKGROUND ART

A variety of devices have been developed to alleviate burdens on the driver of a running vehicle and to enhance driving safety. Illustratively, cruise control systems and like apparatuses for controlling vehicles running at a constant speed have already been commercialized. Currently under development are driving control apparatuses that measure by radar a headway distance and a relative speed of a host vehicle with respect to a preceding vehicle so as to let the host vehicle run while maintaining the headway distance or avoid collision with the preceding vehicle. A cruise control system, once its cruise mode switch is turned on, allows the vehicle to maintain its speed until an operation such as the stepping on the brake pedal is carried out to cancel the cruise mode.

One conventional headway distance maintaining system allows the host vehicle to maintain the headway distance if there is a preceding vehicle, and activates a following control device to get into cruise mode based on an established speed if there is no preceding vehicle. Japanese Patent Laid-open No. Hei 8-192661 discloses a driving control apparatus claimed to work as follows: if the host vehicle trailing the preceding vehicle loses the latter from a radar range, the apparatus sets as a target vehicle speed the vehicle speed in effect when the preceding vehicle was lost. Thereafter, if a suitable reset operation is performed during a predetermined period of time, an initially set vehicle speed is restored; if no reset operation is carried out, the target vehicle speed is established as a new vehicle speed.

One disadvantage of the above and other similar conventional apparatuses is that if the preceding vehicle entering a curve is captured by radar, the apparatus causes the host vehicle to start decelerating well before the curve is reached so as to keep the headway distance unchanged. Another disadvantage is that when the preceding vehicle starts accelerating at the exit of a curve, the host vehicle behind it also starts accelerating even if the trailing vehicle is still negotiating the curve.

DISCLOSURE OF INVENTION

The present invention has been made in view of the above circumstances and provides a vehicle speed control apparatus allowing a host vehicle trailing a preceding vehicle along a curve to accelerate and decelerate in accordance with the configuration of the road.

In carrying out the invention, there is provided a vehicle speed control apparatus comprising detecting means for detecting a headway distance, a relative speed and a direction of a host vehicle with respect to a preceding vehicle, and computing means for computing a speed of the preceding vehicle based on an own speed and the relative speed of the host vehicle. After the speed of the preceding vehicle transiting a given point on a road is acquired and retained, the host vehicle is controlled to pass that point at a speed not exceeding the retained speed of the preceding vehicle. When passing the point in question, the host vehicle may be controlled to run at a speed not exceeding the retained speed of the preceding vehicle while keeping the headway distance to the preceding vehicle from getting shorter than a predetermined value. If subject to a yaw rate of a predetermined minimum value, the host vehicle may be controlled to keep its own speed from exceeding a maximum speed determined by the yaw rate. If the vehicle speed control apparatus further comprises detecting means for detecting headway distances and directions of the host vehicle with respect to a plurality of preceding vehicles, and if the plurality of preceding vehicles change their courses in the same direction, the apparatus may detect the presence of a curve ahead of the host vehicle and may keep the speed of the host vehicle entering the curve not in excess of the speeds of the preceding vehicles. If the plurality of preceding vehicles change their courses in different directions, the vehicle speed control apparatus may control the speed of the host vehicle by getting road information from an onboard navigation device to determine whether the directional change is attributable to the preceding vehicles heading into road branches or changing lanes.

The inventive vehicle speed control apparatus above controls the host vehicle entering a curve in a way that keeps its speed from exceeding the speed of the preceding vehicle that entered the curve earlier. This provides speed control of the host vehicle in keeping with the configuration of the road. Because the lateral acceleration of the host vehicle is proportional to the product of the own speed and a yaw rate of the vehicle, the maximum vehicle speed may be set in accordance with the yaw rate. This keeps the lateral acceleration of the host vehicle from exceeding a predetermined level, thus enhancing ride quality in keeping with the road configuration. When the host vehicle is running a multiple-lane road, the inventive apparatus may detect a plurality of preceding vehicles changing their courses to ascertain the presence of curves and thereby allow the host vehicle to travel in accordance with the road configuration.

BRIEF DESCRIPTION OF DRAWINGS

FIGS. 4 through 6 are flowcharts of steps constituting specific flows of control in trailing mode.

FIG. 13 is a schematic view illustrating a positional relation between the host vehicle and the preceding vehicle as the latter's speed vector is estimated.

BEST MODE FOR CARRYING OUT THE INVENTION

Figure 1:
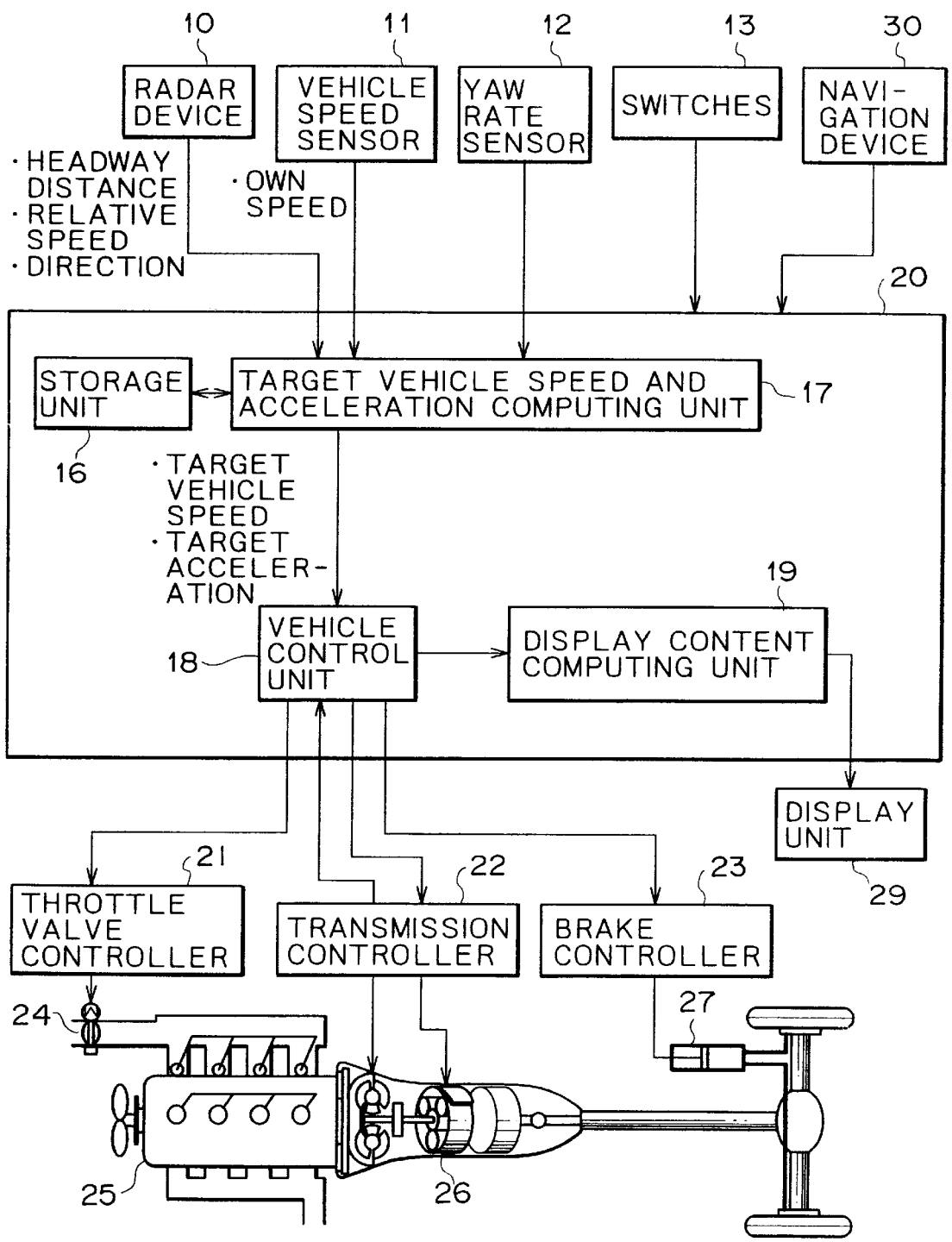
FIG. 1 is a block diagram of a vehicle speed control apparatus embodying the invention.

The best mode for carrying out the invention will now be described with reference to FIGS. 1 through 15. FIG. 1 is a system block diagram of a vehicle speed control apparatus embodying the invention. The vehicle speed control apparatus comprises a main control unit 20 for driving control. The main control unit 20 is connected to a number of components: a radar device 10 capable of detecting headway distances, relative speeds and directions of a host vehicle with respect to a plurality of preceding vehicles; a vehicle speed sensor 11 for measuring an own speed of the host vehicle; a yaw rate sensor 12 for measuring a yaw rate of the host vehicle; and switches 13 making up an input device by which to input commands for starting and stopping driving control as well as a target vehicle speed in cruise mode. Information from a navigation device 30 is also input to the main control unit 20. The main control unit 20 incorporates a storage unit 16, a target vehicle speed and acceleration computing unit 17, a vehicle control unit 18, and a display content computing unit 19. The target vehicle speed and acceleration computing unit 17 computes a target vehicle speed and target acceleration based on the headway distance, the relative speed and the direction measured by the radar device 10, the own speed of the host vehicle measured by the vehicle speed sensor 11, on the yaw rate measured by the yaw rate sensor 12, and on the settings of the switches 13. Given a target vehicle speed and acceleration, the vehicle control unit 18 computes command values destined for a throttle valve controller 21, a transmission controller 22 and a brake controller 23, and outputs the commands to the respective controllers. The settings of the switches 13 and the computed results from the target vehicle speed and acceleration computing unit 17 and vehicle control unit 18 are fed to the display content computing unit 19. Based on the received data, the display content computing unit 19 displays on a display unit 29 driving control indications allowing the driver easily to verify the driving status. The throttle valve controller 21 controls the opening of a throttle valve 24 in accordance with a command value from the vehicle control unit 18. Similarly, the transmission controller 22 and brake controller 23 control a transmission 26 and a brake actuator 27 respectively in keeping with command values supplied by the vehicle control unit 18.

Figure 2:
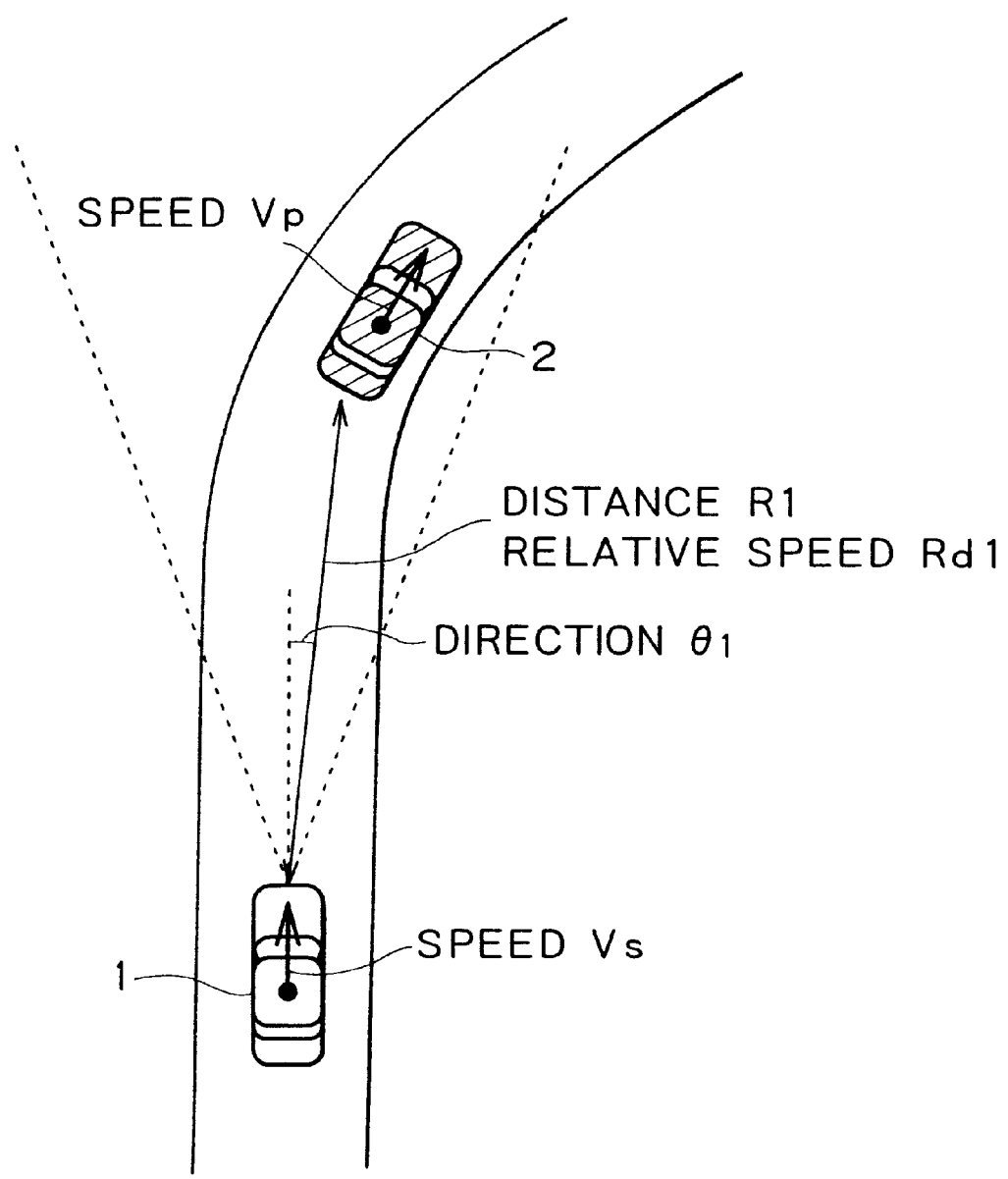
FIG. 2 is a schematic view showing a positional relation between a host vehicle and a preceding vehicle.
Figure 3A:
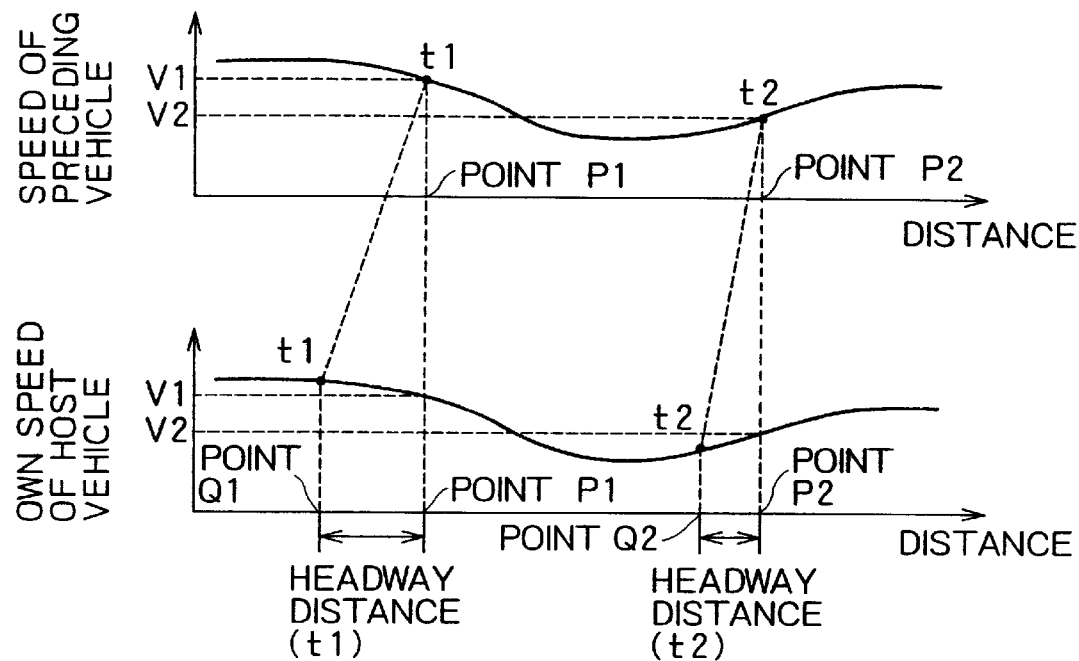
FIGS. 3A and 3B are graphic representations of the speed of the host vehicle varying with respect to that of the preceding vehicle.
Figure 3B:
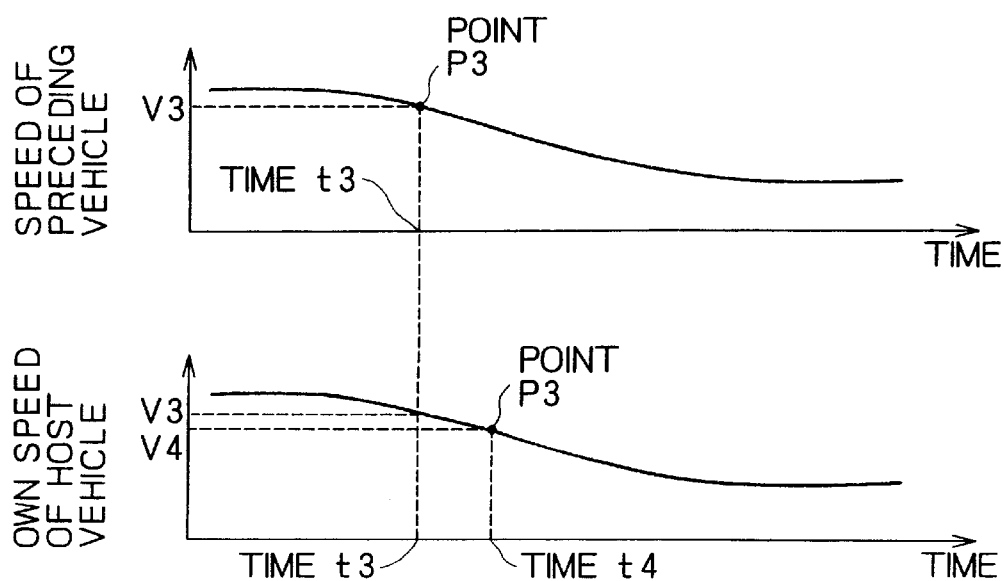

FIG. 2 is a schematic view explaining how the embodiment of the invention operates in practice. FIG. 3A is a graphic representation of the speed of the preceding vehicle versus the own speed of the host vehicle over distance with the embodiment in use. FIG. 3B is a graphic representation of the speed of the preceding vehicle versus the own speed of the host vehicle in effect when a conventional headway distance control apparatus is employed. In the situation of FIG. 2, the host vehicle 1 trails the preceding vehicle 2. The radar device 10 on board the host vehicle 1 measures a distance R1, a relative speed Rdl and a direction $\theta_1$ in relation to the preceding vehicle 2.

With the conventional headway distance control apparatus working as illustrated in FIG. 3B, the own speed of the host vehicle is controlled in synchronism with the speed of the preceding vehicle. Thus the preceding vehicle and host vehicle travel at about the same speed V1 at time t3. In this case, the preceding vehicle passes point P3 at time t3 and, by the time the host vehicle passes point P3 at time t4, the preceding vehicle is traveling at a speed V4. It follows that there occurs a difference in speed (V3–V4) between the preceding vehicle and the host vehicle passing point P3.

With the inventive apparatus working as depicted in FIG. 3A, the preceding vehicle running at speed V1 passes point P1 at time t1 at which the host vehicle passes point Q1. The distance between the host vehicle and the preceding vehicle is equal to the distance between points P1 and Q1. The speed of the preceding vehicle is computed from the own speed of the host vehicle and its relative speed with respect to the preceding vehicle. The target vehicle speed and acceleration computing unit 17 computes a target vehicle speed and target acceleration based on the difference between the speed of the host vehicle and the preceding vehicle speed V1 at time t1, in such a manner that the host vehicle arriving at point P1 will run at speed V1, i.e., the speed at which the preceding vehicle passed point P1 earlier. On the basis of the target vehicle speed and target acceleration thus computed, the vehicle control unit 18 sends suitable command values to the throttle valve controller 21 and transmission controller 22 as well as to an actuator controller in the brake controller 23 for deceleration so that the host vehicle passes point P1 at speed V1. Likewise, when the preceding vehicle accelerates, e.g., when the preceding vehicle is passing point P2 at speed V2 at time t2, the host vehicle is passing point Q2. Given the difference between the own speed and the speed V2 of the preceding vehicle at time t2, the target vehicle speed and acceleration computing unit 17 computes a target vehicle speed and target acceleration accordingly. Based on the target vehicle speed and target acceleration thus computed, the vehicle control unit 18 sends appropriate command values to the throttle valve controller 21 and transmission controller 22 for acceleration so that the host vehicle arriving at point P2 reaches speed V2 at which the preceding vehicle passed P2 earlier.

FIG. 4 is a flowchart of steps constituting a typical driving control routine carried out by the main control unit 20. In step 100, a check is made to see if vehicle speed controlled driving mode is established by the switches 13. In step 101, the own speed of the host vehicle is measured. In step 110, a check is made to see if the onboard radar device 10 is keeping the preceding vehicle within its range. If the preceding vehicle is out of the range of the radar device 10, step 111 is reached in which the host vehicle is controlled so as to maintain a target vehicle speed. If the preceding vehicle is kept within the range of the radar device 10, step 102 is reached in which a headway distance, a relative speed and a direction of the host vehicle in relation to the preceding vehicle are measured by radar. In step 103, a check is made to see if the direction of the preceding vehicle exceeds a predetermined threshold value. If the direction of the preceding vehicle is found to be in excess of the threshold value, i.e., if the preceding vehicle is deviating by a predetermined angle from the frontal direction of the host vehicle, step 104 is reached in which the speed of the preceding vehicle passing a given point is obtained. In step 105, a target speed and target acceleration are acquired so that when the host vehicle reaches that point of the preceding vehicle at which the latter's speed was measured, the own speed of the host vehicle will not exceed the measured speed of the preceding vehicle. If in step 103 the preceding vehicle is judged to be in the frontal direction of the host vehicle, then step 107 is reached. Step 107 is carried out to obtain a target vehicle speed and target acceleration such as to attain a suitable headway distance to the preceding vehicle (e.g., distance to be covered in two seconds by the host vehicle running at its own speed) on the basis of the own speed, current headway distance and relative speed of the host vehicle. Given the target speed and acceleration values thus obtained, the main control unit 20 outputs suitable command values to the throttle valve controller 21, transmission controller 22 and brake controller 23 in order to attain the target values. In the typical routine of FIG. 4, a directional change rate of the preceding vehicle may alternatively be obtained following step 102. In that case, a check is made in step 103 to see if the directional change rate of the preceding vehicle is in excess of a threshold value. This modification also provides similar driving control.

Figure 5:
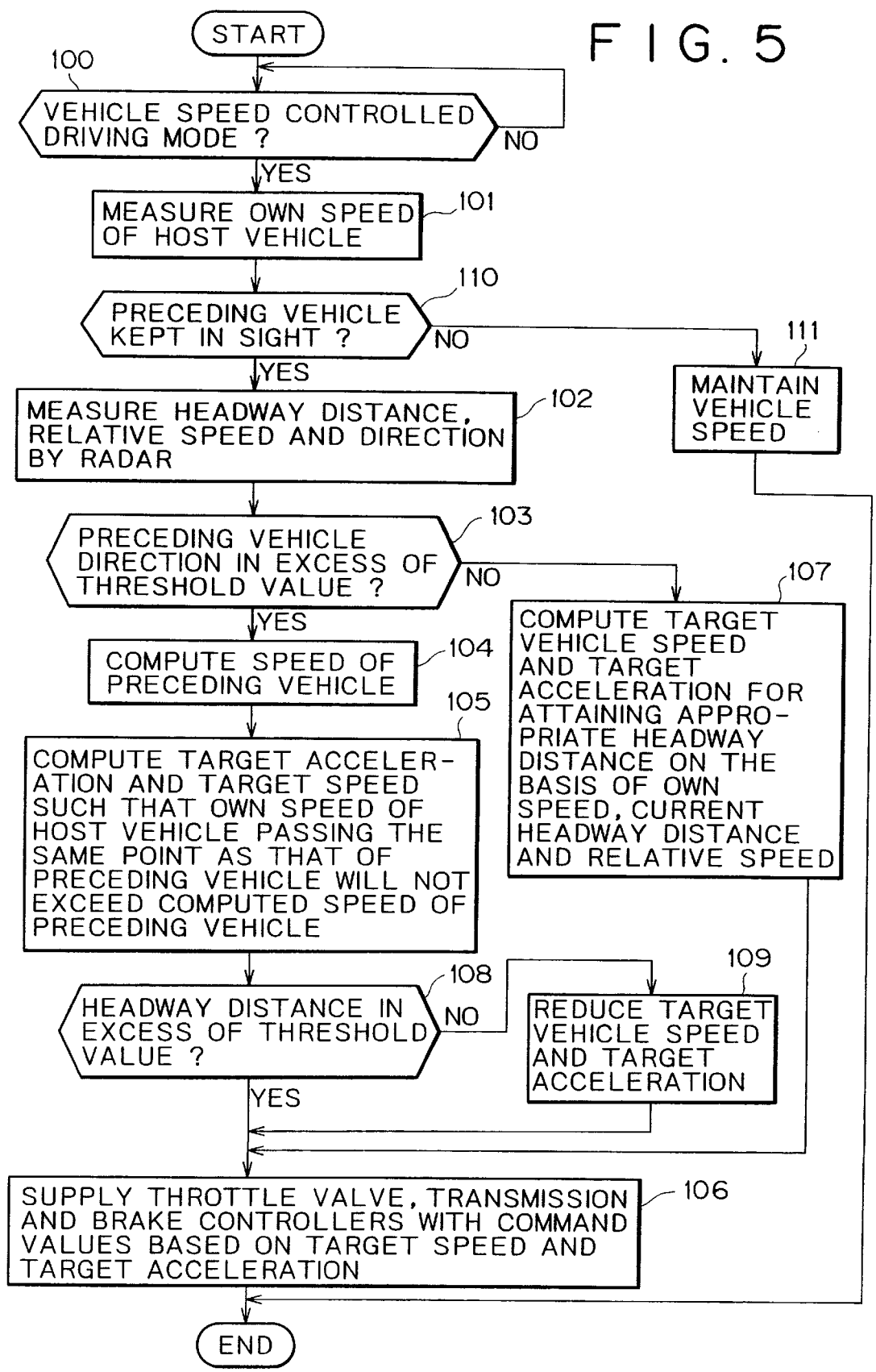

Another typical driving control routine is described below with reference to FIG. 5. The steps leading up to step 105 are the same as those in the flow of driving control in FIG. 4. In step 105, a target speed and target acceleration are obtained. In step 108, a check is made to see if either the headway distance measured in step 102 or a headway distance expected to be brought about upon control execution is in excess of a predetermined threshold value. If either of the headway distances is found to be in excess of the threshold value, i.e., if a sufficient headway distance is judged to be secured, step 106 is reached in which the controllers are supplied with appropriate command values pursuant to the target vehicle speed and target acceleration. If neither of the headway distances is judged to exceed the threshold value in step 108, then step 109 is reached. In step 109, the target speed and acceleration values are reduced so that the headway distance will not be less than the threshold value. The reduced values are handed over to step 106 in which the actuator controllers are fed with appropriate command values for attaining the target values.

Figure 6:
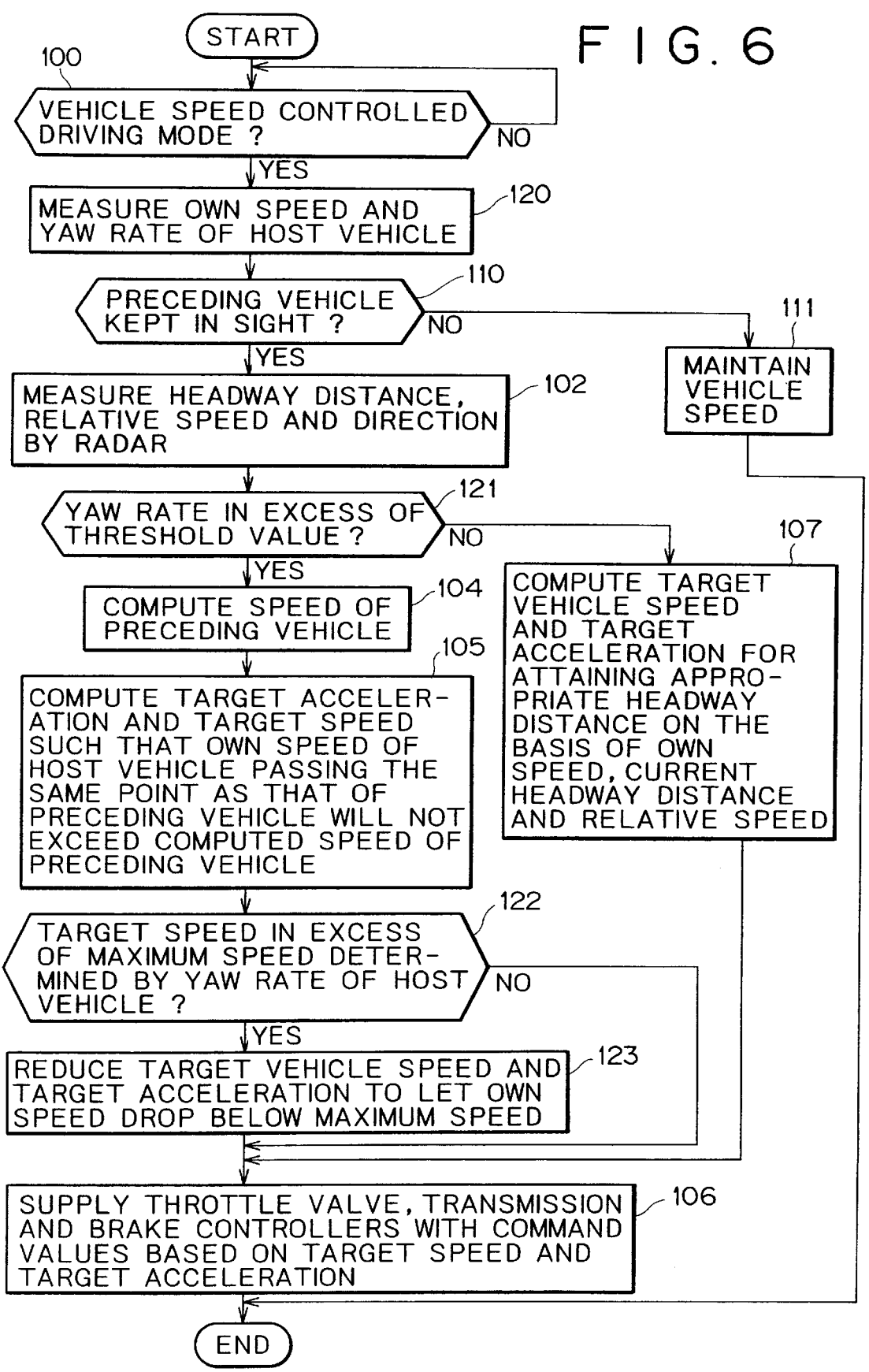

Described below with reference to FIG. 6 is a typical control routine that additionally measures the yaw rate of the host vehicle. After vehicle speed controlled driving mode is judged to be established in step 100, step 120 is reached in which the own speed and yaw rate of the host vehicle are measured. As in the example of FIG. 4, a check is made in step 110 to see if the radar device 10 is keeping the preceding vehicle within its range. If the preceding vehicle is out of the range of the radar device 10, step 111 is reached in which the host vehicle is controlled so as to maintain a target vehicle speed. If the preceding vehicle is kept within the range of the radar device 10, step 102 is reached in which a headway distance, a relative speed and a direction of the host vehicle in relation to the preceding vehicle are measured. In step 121, a check is made to see if the yaw rate of the host vehicle is in excess of a predetermined threshold value. If the yaw rate is found to be in excess of the threshold value, i.e., if the host vehicle is judged to be turning, then step 104 is reached. In step 104, the speed of the preceding vehicle is acquired on the basis of the own speed and relative speed of the host vehicle. In step 105, a target speed and target acceleration are acquired so that when the host vehicle reaches that position of the preceding vehicle which was in effect upon measurement of step 102, the own speed of the host vehicle will not exceed the measured speed of the preceding vehicle. In step 122, a check is made to see if the target speed obtained in step 105 is below a maximum speed determined by the yaw rate. If the target speed is judged to be in excess of the maximum speed, step 123 is reached in which the target vehicle speed and target acceleration are modified so that the vehicle speed will not exceed the maximum speed. On the basis of the target speed and acceleration values thus acquired, the actuator controllers are supplied in step 106 with appropriate command values for attaining the target values.

Figure 7:
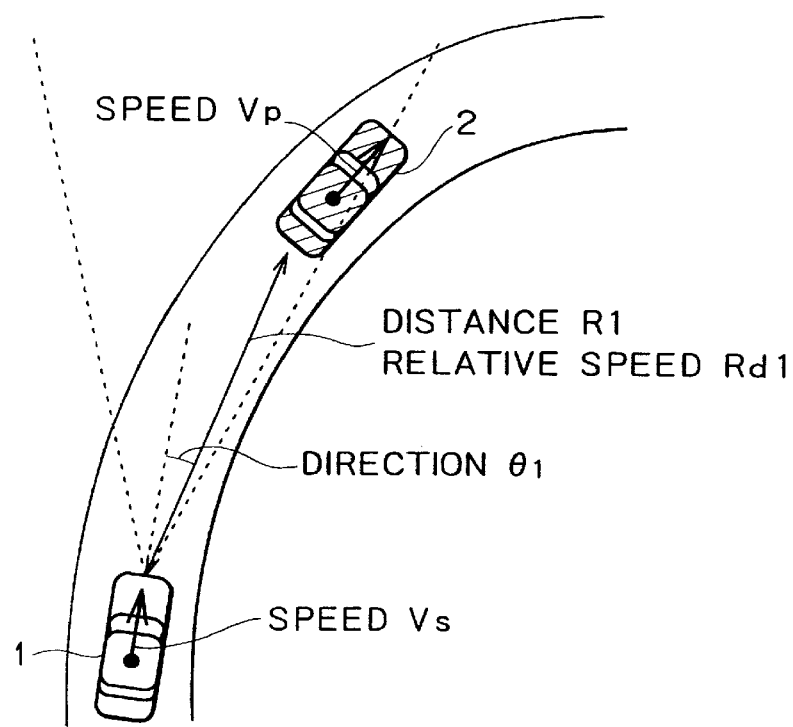
FIGS. 7 and 8 are schematic views depicting positional relations between the host and preceding vehicles as the host vehicle loses sight of the preceding vehicle.
Figure 8:
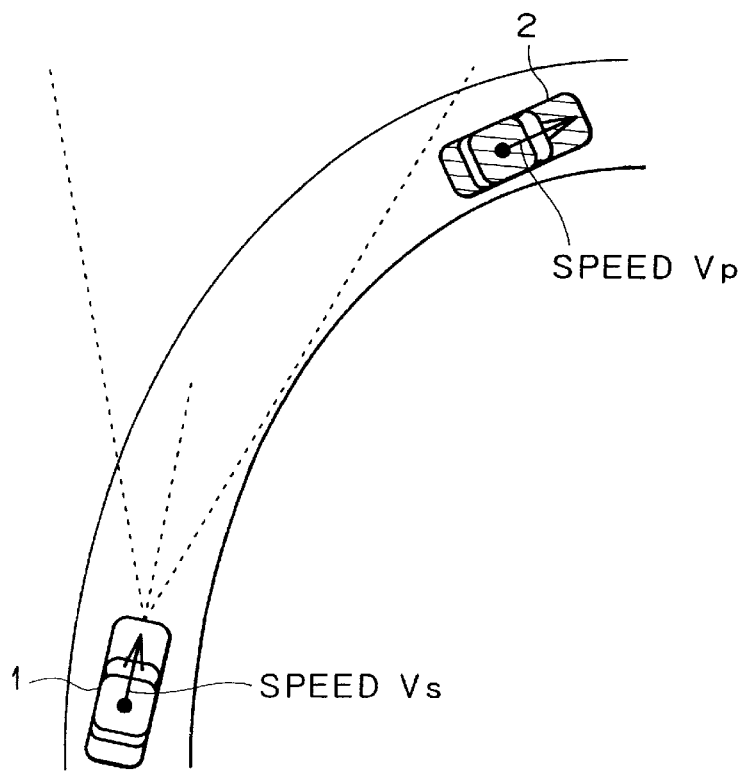
Figure 9:
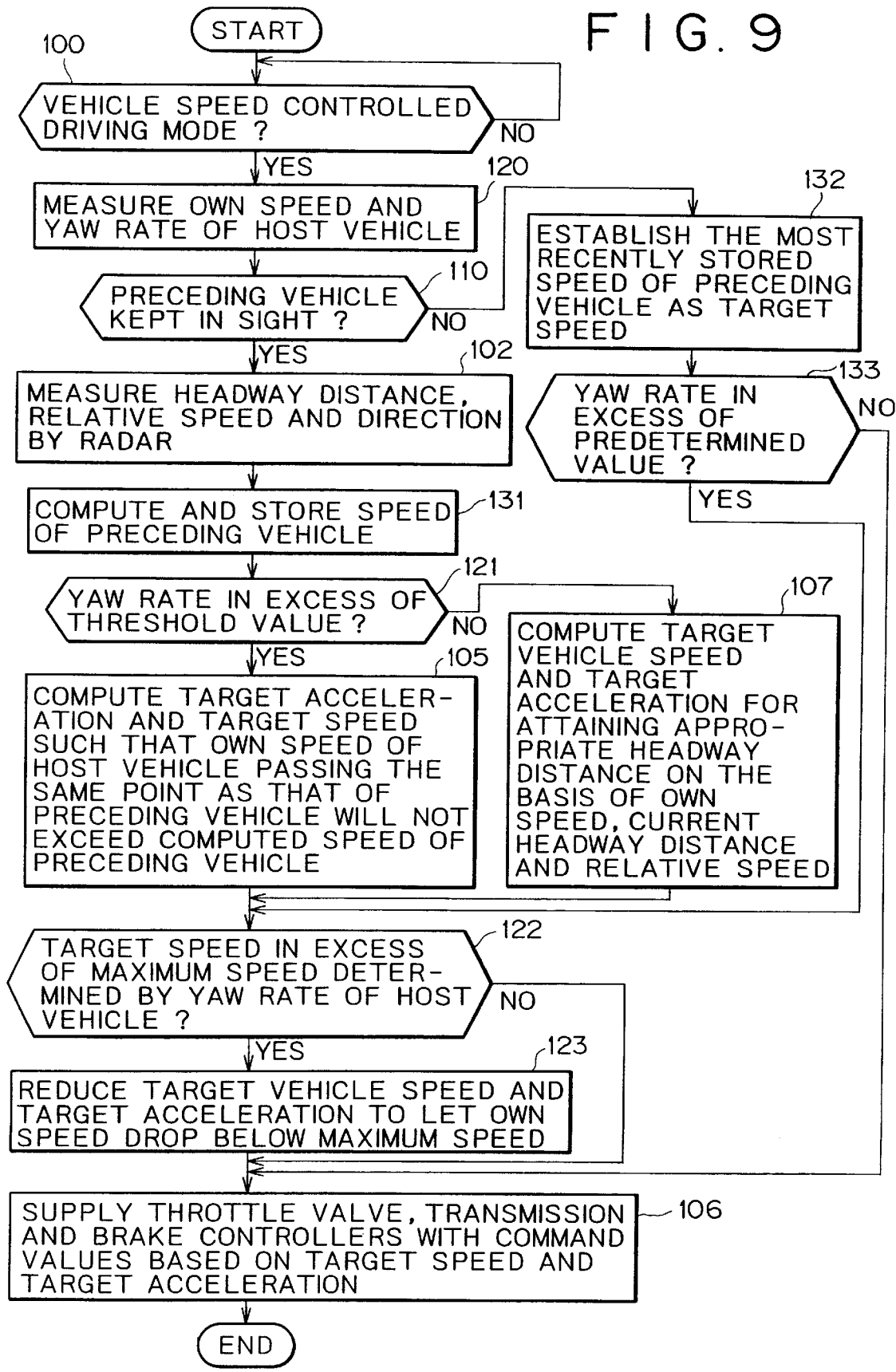
FIG. 9 is a flowchart of steps constituting a flow of control in effect when the host vehicle while negotiating a curve loses sight of the preceding vehicle.

Described below with reference to FIGS. 7, 8 and 9 is a typical control routine for use when the preceding vehicle is lost from the radar range while the host vehicle is negotiating a curve.

In the situation of FIG. 7, the onboard radar device 10 measures the distance R1, relative speed Rd1 and direction $\theta_1$ of the host vehicle 1 in relation to the preceding vehicle 2. In the situation of FIG. 8, the preceding vehicle 2 is out of the radar range. In these drawings, dotted lines represent measuring ranges of radar.

FIG. 9 is a flowchart of steps constituting the control routine for use in the situations of FIGS. 7 and 8. After vehicle speed controlled driving mode is judged to be established in step 100, step 120 is reached in which the own speed and yaw rate of the host vehicle are measured. In step 110, a check is made to see if the preceding vehicle is caught within the radar range. If the preceding vehicle is kept within the radar range, step 102 is reached in which a headway distance, a relative speed and a direction of the host vehicle in relation to the preceding vehicle are measured. In step 131, the speed of the preceding vehicle is computed and stored into the storage unit 16. In step 121, a check is made to see if the yaw rate of the host vehicle is in excess of a predetermined threshold value. If the yaw rate is found to be in excess of the threshold value, i.e., if the host vehicle is judged to be turning, then step 105 is reached. In step 105, a target speed and target acceleration are acquired so that when the host vehicle reaches that position of the preceding vehicle which was in effect upon measurement of step 102, the own speed of the host vehicle will become equal to the measured speed of the preceding vehicle. If in step 121 the yaw rate is judged to be below the threshold value, then step 107 is reached. Step 107 is carried out to obtain a target vehicle speed and target acceleration such as to attain a suitable headway distance to the preceding vehicle (e.g., distance to be covered in two seconds by the host vehicle running at its own speed) on the basis of the own speed, current headway distance and relative speed of the host vehicle. If in step 110 the preceding vehicle is judged to be out of the radar range, step 132 is reached in which the most recently stored speed of the preceding vehicle is established as a target vehicle speed. If the yaw rate is judged to be in excess of the threshold value, step 122 is reached; if the yaw rate is found to be below the threshold value, step 106 is reached. In step 122, a check is made to see if the target speed obtained in step 105 or 107 is below a maximum speed determined by the yaw rate. If the target speed is judged to be in excess of the maximum speed, step 123 is reached in which the target vehicle speed and target acceleration are modified so that the vehicle speed will not exceed the maximum speed. In keeping with the target speed and acceleration values thus acquired, the actuator controllers are supplied in step 106 with appropriate command values for attaining the target values.

Figure 10:
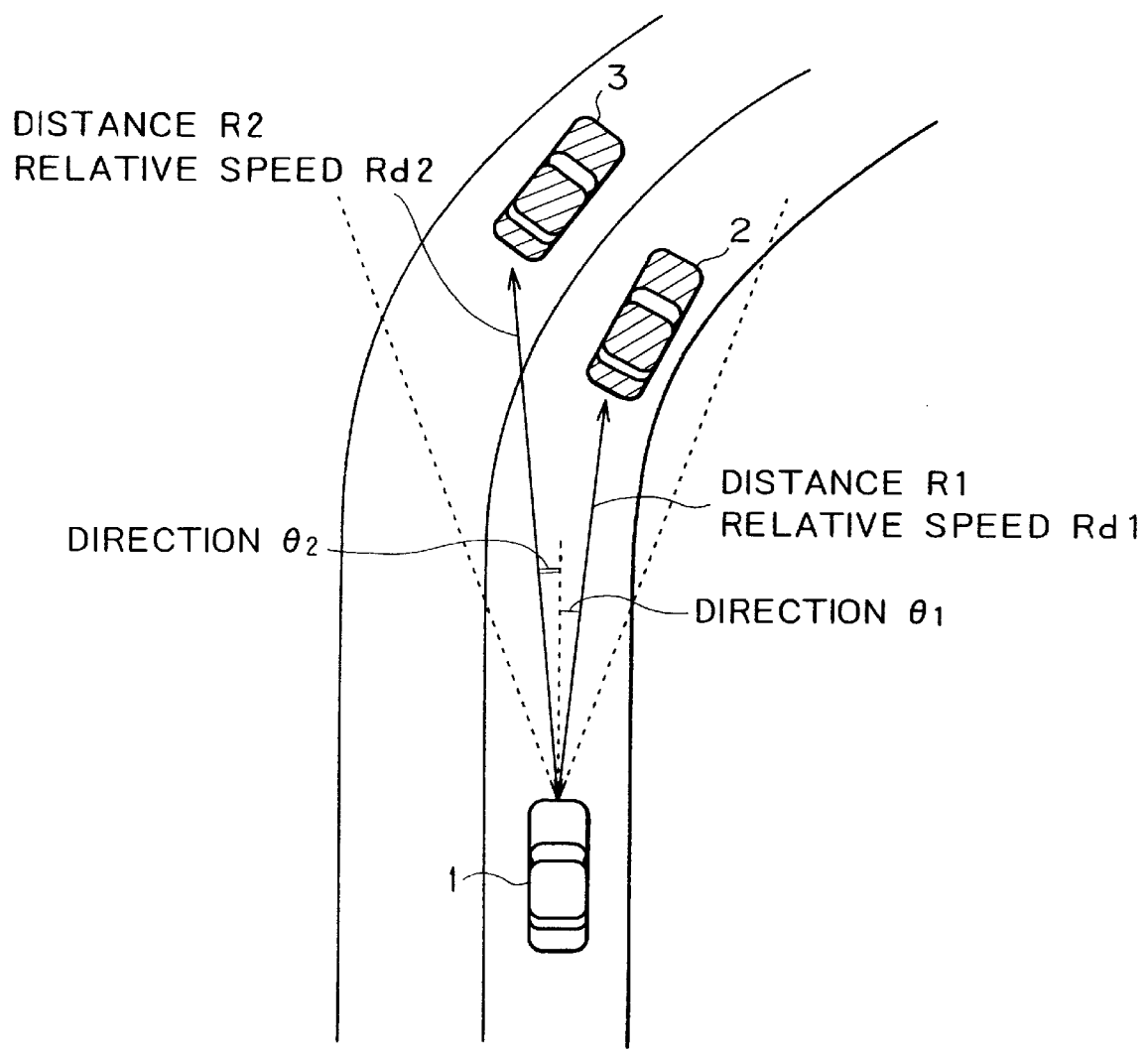
FIGS. 10 and 11 are schematic views indicating positional relations between the host vehicle and a plurality of preceding vehicles.
Figure 11:
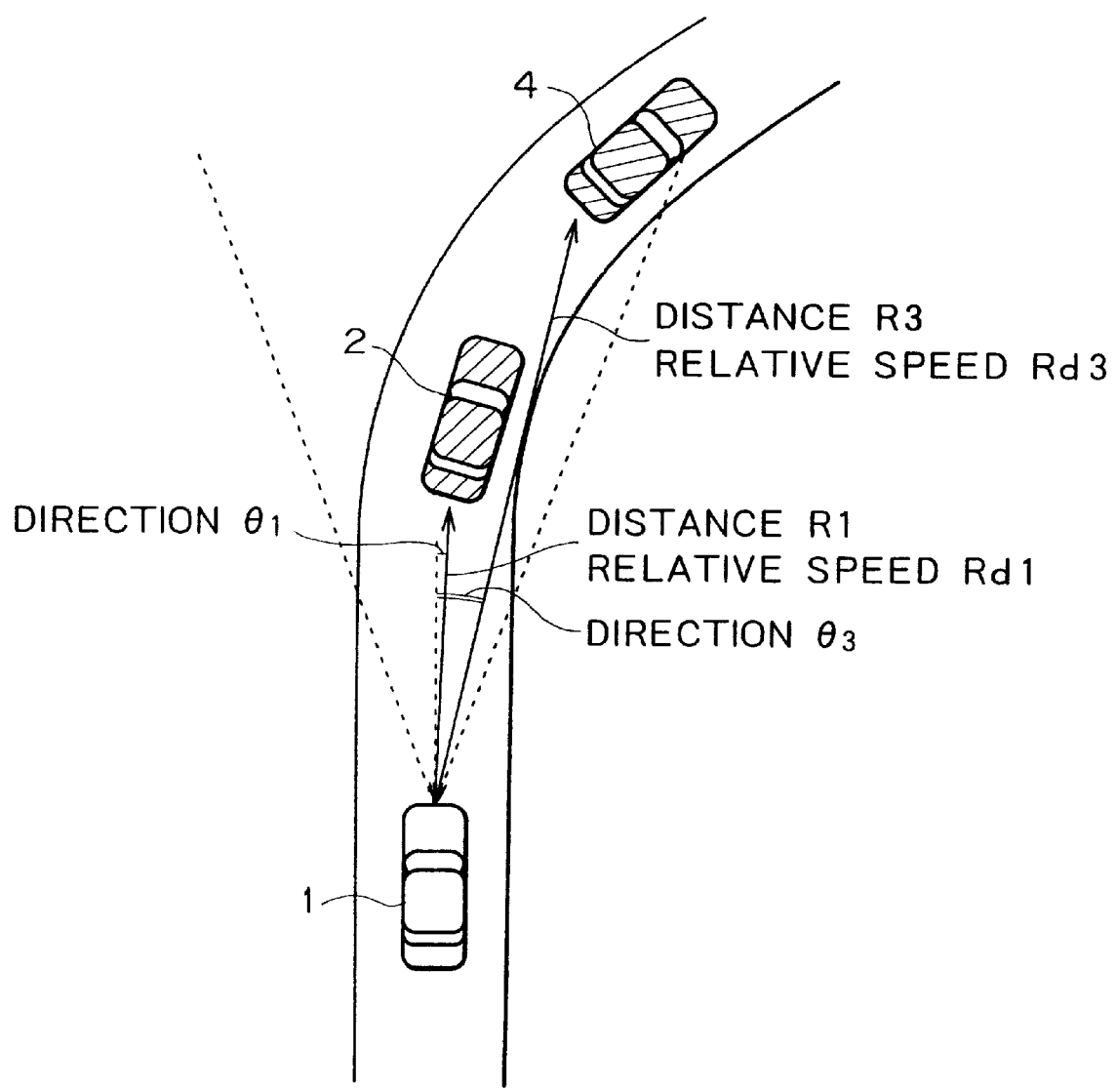
Figure 12:
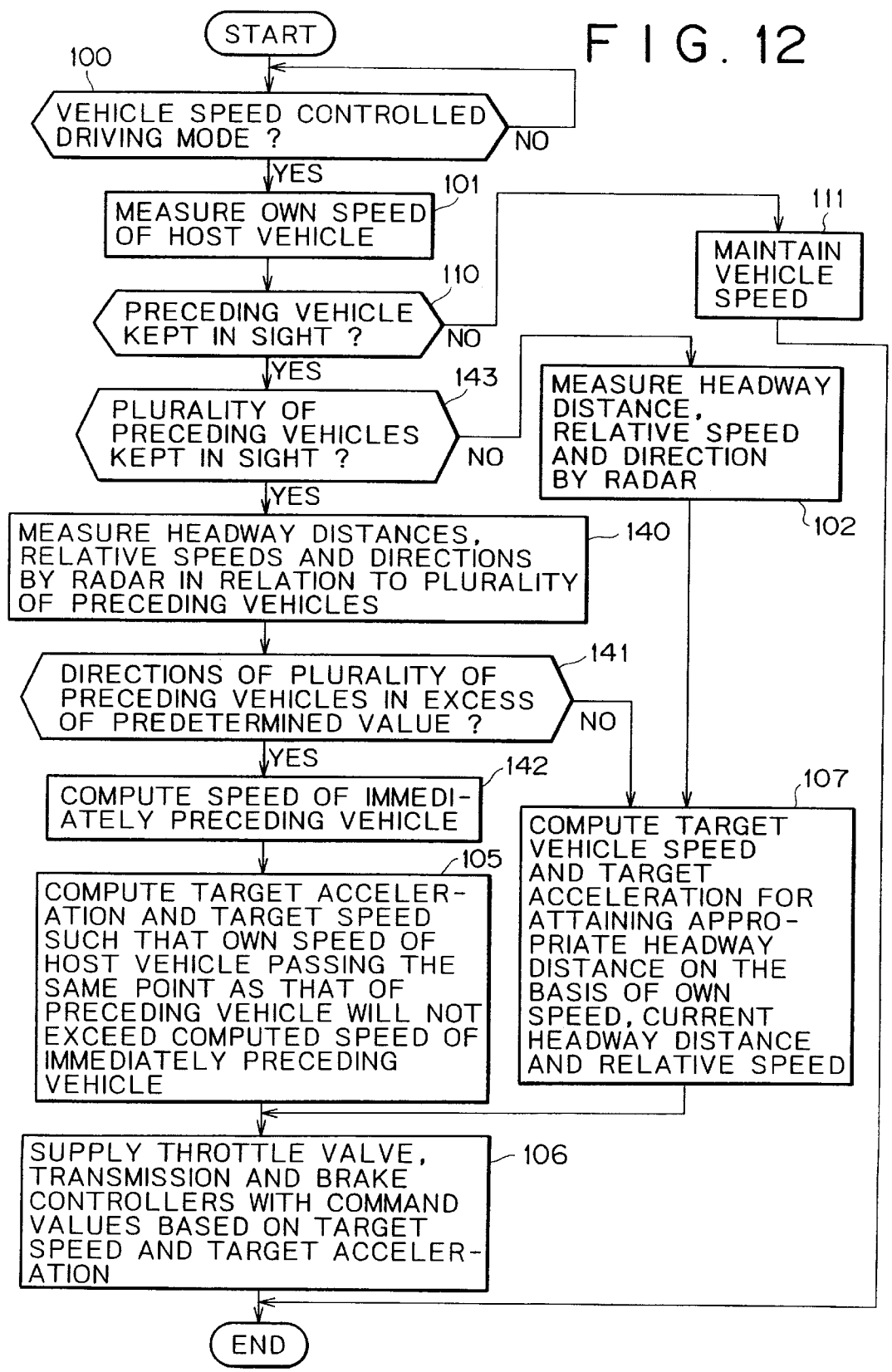
FIG. 12 is a flowchart of steps constituting a flow of control of the host vehicle trailing a plurality of preceding vehicles.

Described with reference to FIGS. 10 through 12 is a typical control routine for use when a plurality of preceding vehicles are caught within the radar range. In the situation of FIG. 10, the onboard radar device 10 measures the headway distance R1, relative speed Rd1 and direction $\theta_1$ of the host vehicle 1 in relation to the preceding vehicle 2, as well as a headway distance R2, a relative speed Rd2 and a direction $\theta_2$ of the host vehicle 1 in relation to another preceding vehicle 3. In the situation of FIG. 11, the onboard radar device 10 measures a headway distance R3, a relative speed Rd3 and a direction $\theta_3$ of the host vehicle 1 in relation to yet another preceding vehicle 4 running ahead of the preceding vehicle 2.

FIG. 12 is a flowchart of steps constituting the control routine for use in the situations outlined above. After vehicle speed controlled driving mode is judged to be established in step 100, step 101 is reached in which the own speed of the vehicle is measured. In step 110, a check is made to see if the radar device 10 is keeping at least one preceding vehicle within its range. If no preceding vehicle is caught within the radar range, step 111 is reached in which the host vehicle is controlled so as to maintain a target vehicle speed. If in step 110 at least one preceding vehicle is found to be kept within the radar range, step 143 is reached. In step 143, a check is made to see if there are at least two preceding vehicles. If two preceding vehicles are not found within the radar range, step 102 is reached in which the headway distance, relative speed and direction of the host vehicle in relation to one preceding vehicle are measured. Step 102 is followed by step 107. If at least two preceding vehicles are detected in step 143, step 140 is reached in which the headway distances, relative speeds, and directions of the host vehicle in relation to the plurality of preceding vehicles are measured. In step 141, a check is made to see if the directions of the plurality of preceding vehicles including the immediately preceding vehicle are in excess of a predetermined threshold value. If the directions of the preceding vehicles are judged to exceed the threshold value, step 142 is reached in which the immediately preceding vehicle is selected and its speed is obtained. In step 105, a target speed and target acceleration are acquired so that when the host vehicle reaches that position of the immediately preceding vehicle which was in effect upon measurement of the latter's speed, the own speed of the host vehicle will not exceed the measured speed of the preceding vehicle. If in step 141 the directions of the plurality of preceding vehicles are judged to be below the threshold value, or if in step 143 only one preceding vehicle is judged to be present, then step 107 is reached. Step 107 is carried out to obtain a target vehicle speed and target acceleration such as to attain a suitable headway distance to the preceding vehicle on the basis of the own speed, current headway distance and relative speed of the host vehicle in relation to the preceding vehicle. Given the target speed and acceleration values thus obtained, the main control unit 20 in step 106 outputs appropriate command values to the throttle valve controller 21, transmission controller 22 and brake controller 23 in order to attain the target values.

Figure 14:
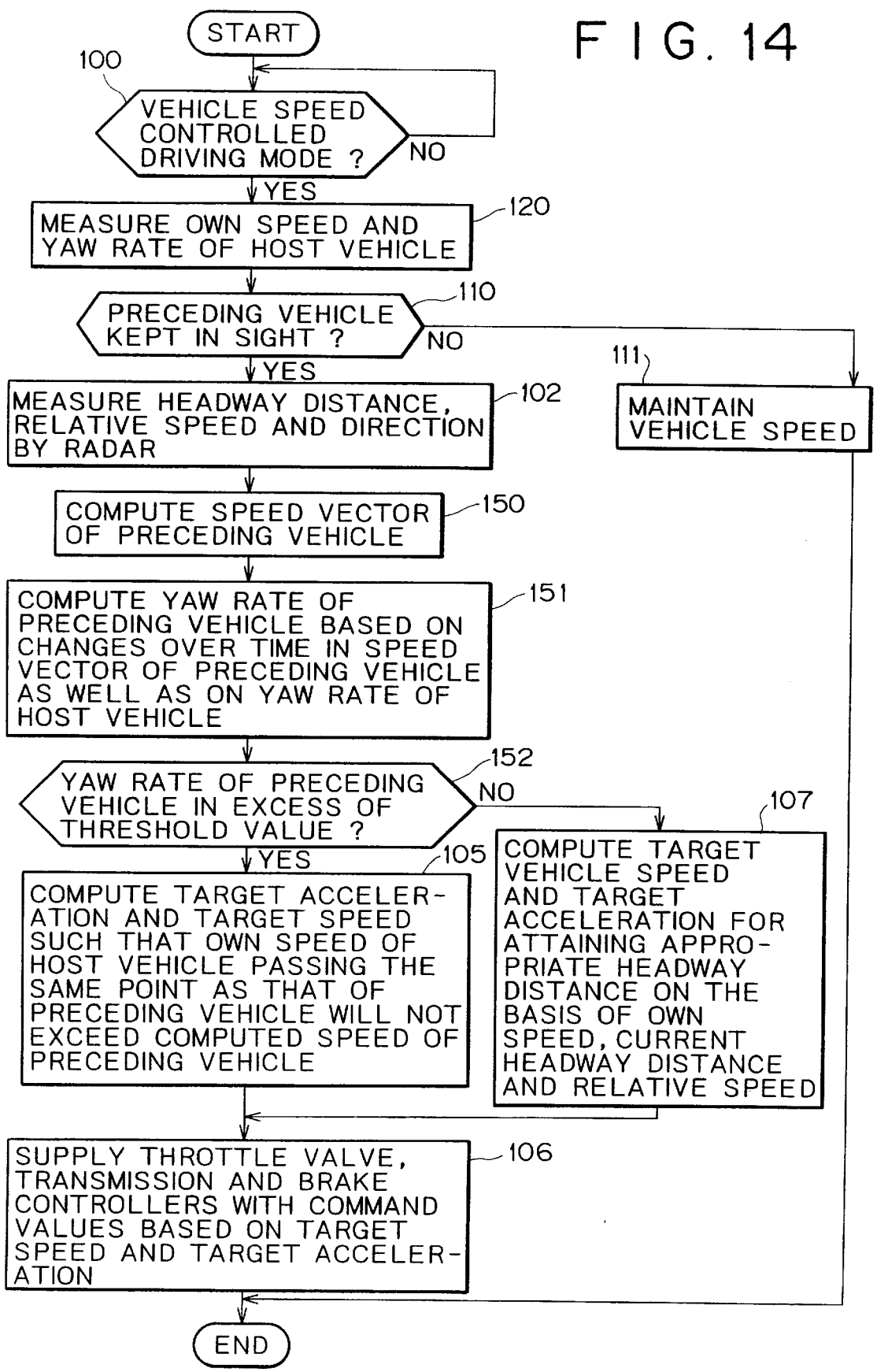
FIGS. 14 and 15 are flowcharts of steps constituting flows of control in estimating the speed vector of the preceding vehicle.
Figure 15:
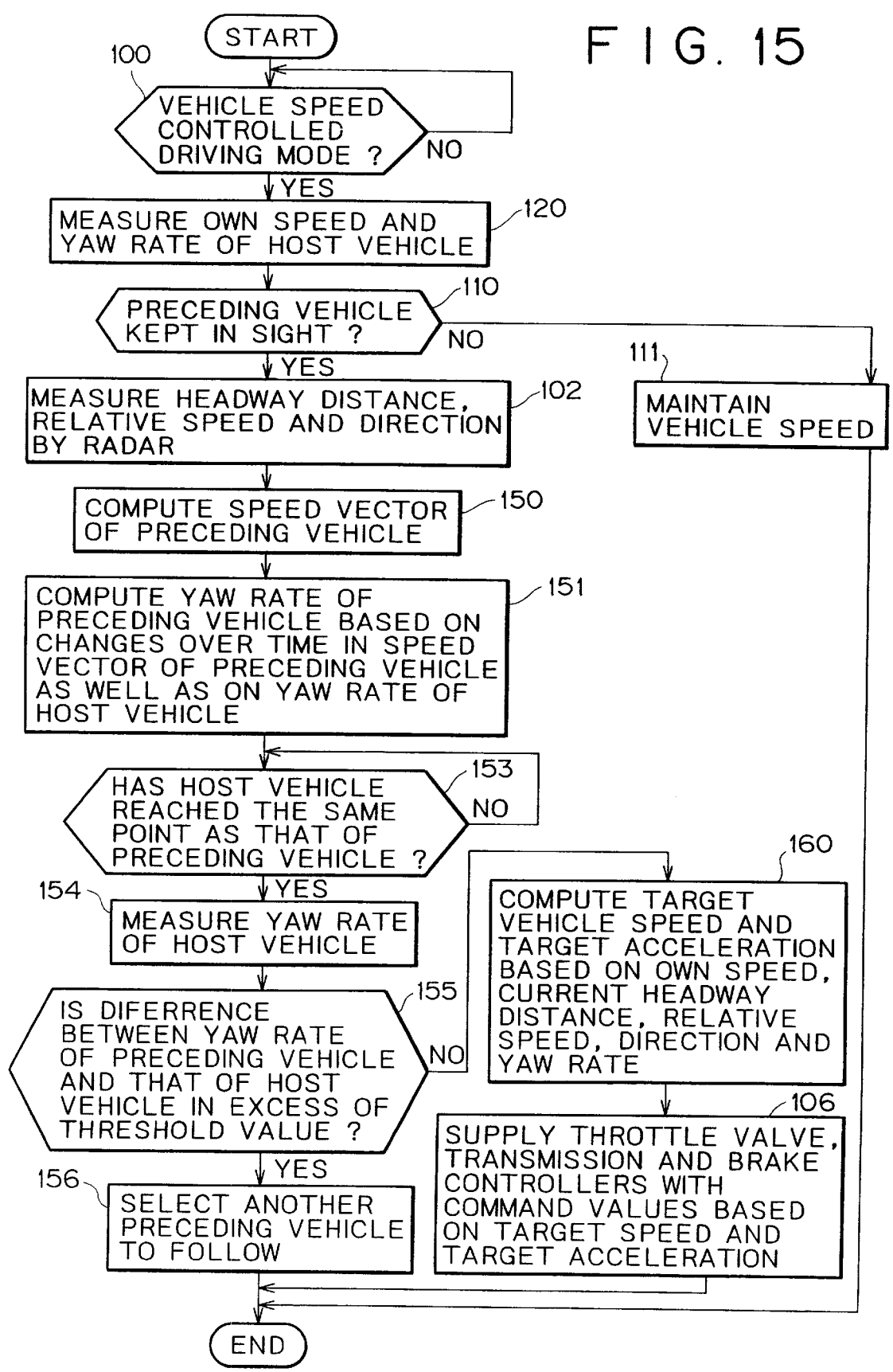

Described below with reference to FIGS. 13 through 15 is typical means for allowing the host vehicle to control its own speed by computing a relative speed vector of the preceding vehicle.

FIG. 13 shows a method for obtaining a speed vector and a yaw rate of the preceding vehicle. It is assumed that the frontal direction of the host vehicle 1 is represented by the Y axis and the direction perpendicular to the Y axis at the radar position is denoted by the X axis. The headway distance and direction of the host vehicle measured by radar relative to the preceding vehicle are used as a basis for acquiring relative coordinates (x, y) of the host vehicle in relation to the preceding vehicle. The coordinates are temporally differentiated to provide a relative speed vector as a temporally differentiable function of the headway distance R, relative speed Rd, and direction θ of the host vehicle. A speed vector direction φ of the preceding vehicle is obtained in terms of polar coordinates of the relative speed vector. As a result, a relative yaw rate ω of the preceding vehicle as viewed from the host vehicle 1 is acquired as a function of speed vector components and differential values of the components.

FIG. 14 is a flowchart of steps constituting a typical routine for controlling the own speed of the host vehicle through acquisition of the speed vector and yaw rate of the preceding vehicle. The steps leading up to step 102 are the same as those in the flow of FIG. 9. In step 150, a relative speed vector of the preceding vehicle is obtained. In step 151, a relative yaw rate acquired from changes in the speed vector of the preceding vehicle is added to the yaw rate of the host vehicle to provide a yaw rate of the preceding vehicle. In step 152, a check is made to see if the yaw rate of the preceding vehicle is in excess of a predetermined threshold value. If the yaw rate is judged to be in excess of the threshold value, step 105 is reached. In step 105, a target speed and target acceleration are acquired so that when the host vehicle reaches that position of the preceding vehicle which was in effect at the previous speed measurement, the own speed of the host vehicle will become equal to the measured speed of the preceding vehicle. If in step 152 the yaw rate is judged to be below the threshold value, the step 107 is reached. Step 107 is carried out to obtain a target vehicle speed and target acceleration such as to attain a suitable headway distance to the preceding vehicle on the basis of the own speed, current headway distance and relative speed of the host vehicle. In keeping with the target speed and acceleration values thus acquired, the main control unit 20 in step 106 supplies the actuator controllers with appropriate command values for attaining the target values.

FIG. 15 is a flowchart of steps constituting a typical routine for use when the speed vector is utilized for control. The steps leading up to step 151 are the same as those in the flow of FIG. 13, whereby the speed vector of the preceding vehicle is computed. In step 153, a check is made to see if the host vehicle has reached that position of the preceding vehicle which was in effect upon measurement in step 102. When the host vehicle is judged to have reached the previously measured position of the preceding vehicle, step 154 is reached in which the yaw rate of the host vehicle is measured. In step 155, a check is made to see if the difference between the yaw rate of the preceding vehicle computed in step 151 and the yaw rate of the host vehicle measured in step 154 is in excess of a predetermined threshold value. If the difference is judged to be in excess of the threshold value in step 155, that means the direction in which the preceding vehicle is running differs from the frontal direction of the host vehicle. In that case, the host vehicle is stopped from following the immediately preceding vehicle. If in step 155 the difference in yaw rate between the preceding vehicle and the host vehicle is found to be less than the threshold value, step 160 is reached. Step 160 is carried out to obtain a target vehicle speed and a target headway distance on the basis of the own speed, current headway distance, relative speed, direction and yaw rate of the host vehicle. In keeping with the target values thus acquired, the actuator controllers are supplied in step 106 with command values for attaining these target values.

Figure 16:
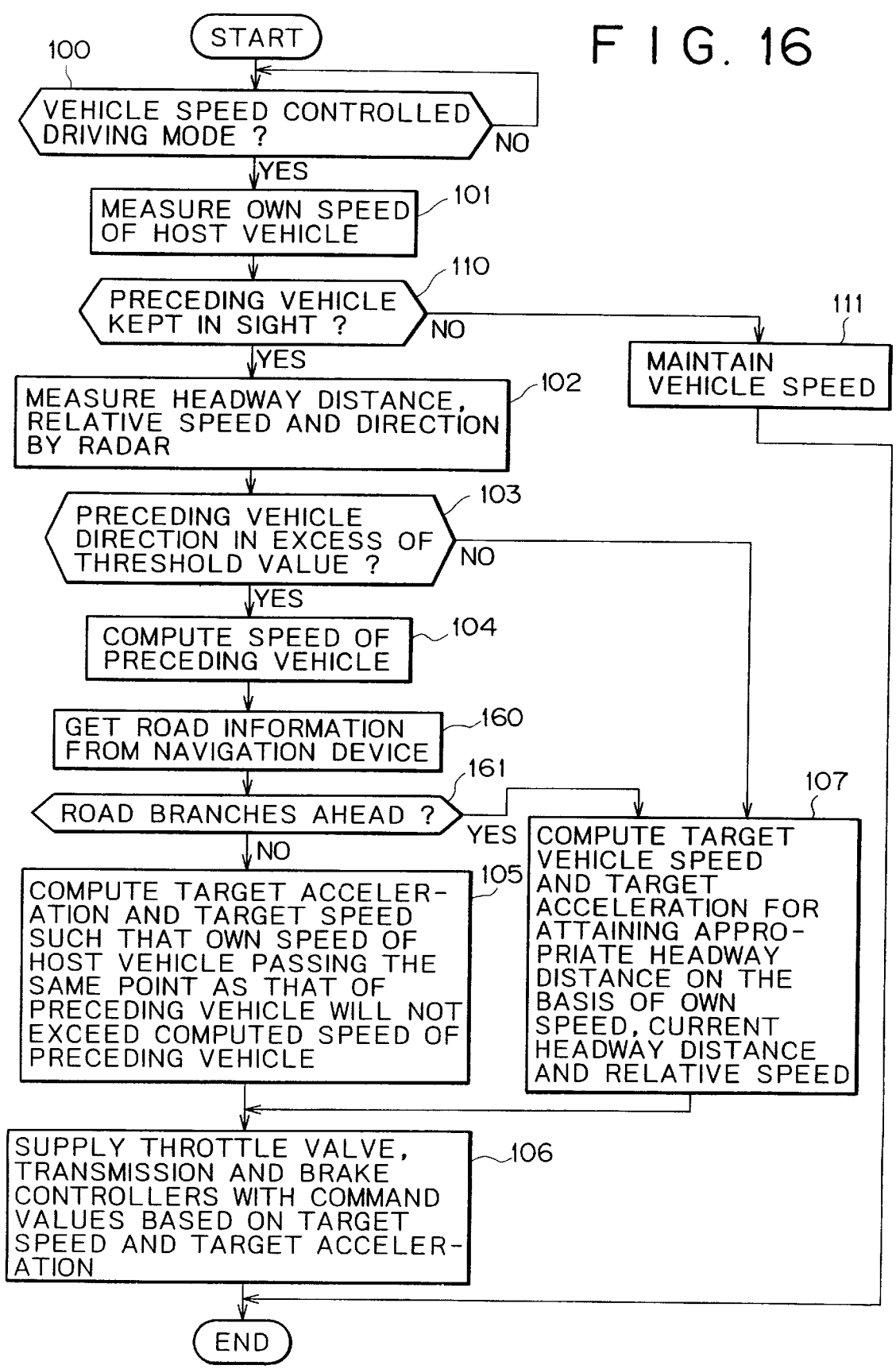
FIG. 16 is a flowchart of steps constituting a flow of control in effect when information from a navigation device is utilized.

FIG. 16 is a flowchart of steps constituting a typical routine for use when road information from a navigation device is utilized. The steps leading up to step 104 are the same as those in the flow of FIG. 4. In step 160, the main control unit 20 receives road information regarding the current vehicle position from the navigation device 30. Given the road information, a check is made in step 161 to see if road branches exist near the host or preceding vehicle. If no road branches are judged to exist, step 105 is reached. In step 105, a target speed and target acceleration are acquired so that when the host vehicle reaches that position of the preceding vehicle which was in effect upon the previous speed measurement, the own speed of the host vehicle will not exceed the measured speed of the preceding vehicle. If road branches are judged to exist in step 161, then step 107 is reached. Step 107 is carried out to obtain a target vehicle speed and target acceleration such as to attain a suitable headway distance to the preceding vehicle on the basis of the own speed, current headway distance and relative speed of the host vehicle. In keeping with the target speed and acceleration values thus acquired, the main control unit 20 in step 106 supplies the throttle valve controller 21, transmission controller 22 and brake controller 23 with command values for attaining the target values.

Industrial Applicability

As described, the embodiment of the invention measures and stores the speed of the preceding vehicle as it passes a given point on the road. When passing the same point, the host vehicle is controlled by the embodiment to run at a speed not in excess of the stored speed of the preceding vehicle. The embodiment thus allows the host vehicle entering a curve to run at a speed not exceeding the speed of the preceding vehicle having entered the same curve earlier. This provides the host vehicle with speed control such that its driver can follow the configuration of the road with a minimum of discomfort. Because the host vehicle is allowed to run while estimating the speed vector of the vehicle running ahead, the host vehicle can trail the preceding vehicle comfortably even along a complicated road configuration comprising numerous curves.

What is claimed is:

1. A vehicle speed control apparatus comprising:
   detecting means for detecting headway distances, relative speeds and directions of a host vehicle in relation to a plurality of preceding vehicles;
   detecting means for detecting a host vehicle speed;
   computing means fore computing speeds of said plurality of preceding vehicles based on said host vehicle speed and said relative speeds of said host vehicles; and
   controlling means which, if said plurality of preceding vehicles are found turning in the same direction, then judges that said host vehicle is heading toward a curved road and controls at least one of a throttle valve device, a transmission device and a braking device so that said host vehicle speed entering said curved road does not exceed the speed of the immediately preceding vehicle having entered said curved road earlier.

2. A vehicle speed control apparatus comprising:
   detecting means for detecting headway distances,
   relative speeds and directions of a host vehicle in relation to a plurality of preceding vehicles;
   detecting means for detecting a host vehicle speed;
   computing means for computing speeds of said plurality of preceding vehicles based on said host vehicle speed and said relative speeds of said host vehicle; and
   controlling means which, if said plurality of preceding vehicles are found turning in different directions, then controls at least one of a throttle valve device, a transmission device and a braking device so as to maintain said host vehicle speed for a predetermined period of time.

3. A vehicle speed control apparatus comprising:
   detecting means for detecting headway distances, relative speeds and directions of a host vehicle in relation to a plurality of preceding vehicles;
   detecting means for detecting a host vehicle speed;
   computing means for computing speeds of said plurality of preceding vehicles based on said host vehicle speed and said relative speeds of said host vehicles; and
   controlling means which, if said plurality of preceding vehicles are found turning in different directions, then acquires road information about a currently-taken road from a navigation device, said controlling means further determining a target speed of said host vehicle based on the computed speeds of said plurality of preceding vehicles and on the acquired road information.

4. A vehicle speed control apparatus according to claim 3, wherein said road information includes road branch information;
   wherein, if said road information points to road branches ahead, then said controlling means allows said host vehicle to trail the immediately preceding vehicle; and
   wherein, if said road information indicates absence of any road branches ahead, then said controlling means controls at least one of a throttle valve device, a transmission device and a braking device so as to maintain said host vehicle speed for a predetermined period of time.

5. A vehicle speed control apparatus according to claim 3, wherein said road information includes road lane information;
   wherein, if a one-sided single-lane road is currently taken, then said controlling means allows said host vehicle to trail the immediately preceding vehicle; and
   wherein, if a one-side multiple-lane road is currently taken, then said controlling means controls at least one of a throttle valve device, a transmission device and a braking device so as to maintain said host vehicle speed for a predetermined period of time.

6. A vehicle speed control apparatus comprising:
   detecting means for detecting a headway distance, a relative speed and a direction of a host vehicle in relation to a preceding vehicle;
   trailing means for allowing said host vehicle to trail said preceding vehicle;
   detecting means for detecting a host vehicle speed and a yaw rate of said host vehicle;
   computing means for computing a speed vector of said preceding vehicle with respect to said host vehicle on the basis of said relative speed and said direction;
   computing means for computing a yaw rate of said preceding vehicle on the basis of changes in said speed vector; and
   comparing means which, if the yaw rate of said preceding vehicle passing a given point is judged to be in excess of a predetermined value, then stores the yaw rate of said preceding vehicle, said comparing means further comparing the stored yaw rate of said preceding vehicle with the detected yaw rate of said host vehicle when said host vehicle reaches the point at which the yaw rate of said preceding vehicle was stored.

7. A vehicle speed control apparatus according to claim 6, further comprising controlling means which, if a difference between the yaw rate of said preceding vehicle and the yaw rate of said host vehicle is judged to exceed a predetermined value, then controls at least one of a throttle valve device, a transmission device and a braking device so as to stop said host vehicle from trailing said preceding vehicle and to maintain said host vehicle speed for a predetermined period of time.

8. A vehicle speed control apparatus according to claim 6, further comprising controlling means which, if a difference between the yaw rate of said preceding vehicle and the yaw rate of said host vehicle is judged to be below a predetermined value, then stores a speed of said preceding vehicle passing a given point and controls at least one of a throttle valve device, a transmission device and a braking device so that said host vehicle speed passing said point does not exceed the stored speed of said preceding vehicle.

* * * * *